United States Patent
Eliyahu-Gross et al.

(10) Patent No.: US 11,155,642 B2
(45) Date of Patent: Oct. 26, 2021

(54) CARBOXYMETHYL CELLULOSE AND METHOD OF PREPARATION

(71) Applicant: Core Scientific Creations Ltd., Kfar Saba (IL)

(72) Inventors: Shani Eliyahu-Gross, Kfar Saba (IL); Yuval Yaskil, Kfar Saba (IL)

(73) Assignee: CORE SCIENTIFIC CREATIONS LTD., Petah Tiqva (IL)

( * ) Notice: Subject to any disclaimer, the term of this patent is extended or adjusted under 35 U.S.C. 154(b) by 92 days.

(21) Appl. No.: 15/522,677

(22) PCT Filed: Oct. 30, 2015

(86) PCT No.: PCT/IB2015/058407
§ 371 (c)(1),
(2) Date: Apr. 27, 2017

(87) PCT Pub. No.: WO2016/067266
PCT Pub. Date: May 6, 2016

(65) Prior Publication Data
US 2017/0335017 A1    Nov. 23, 2017

Related U.S. Application Data

(60) Provisional application No. 62/073,798, filed on Oct. 31, 2014.

(51) Int. Cl.
*C08B 1/08*    (2006.01)
*C08B 11/12*    (2006.01)

(52) U.S. Cl.
CPC ............ *C08B 11/12* (2013.01); *C08B 1/08* (2013.01)

(58) Field of Classification Search
CPC .. C08B 11/02; C08B 1/08; A23V 2250/51082
USPC ........................................................ 536/124
See application file for complete search history.

(56) References Cited

U.S. PATENT DOCUMENTS

2007/0167971 A1    7/2007    Huey et al.

FOREIGN PATENT DOCUMENTS

| CN | 1673233 A | | 9/2005 | |
|---|---|---|---|---|
| CN | 101475645 A | | 7/2009 | |
| CN | 101491688 A | * | 7/2009 | |
| GB | 782479 | * | 9/1957 | ........... C07C 51/412 |

OTHER PUBLICATIONS

International Search Report dated Jan. 19, 2016, International Application No. PCT/IB2015/058407, pp. 1-5.
H. D. Heydarzadeh et al., "Catalyst-Free Conversion of Alkali Cellulose to Fine Carboxymethyl Cellulose at Mild Conditions", World Applied Sciences Journal, vol. 6, No. 4, 2009, pp. 564-569.
Thomas Heinze et al., "Studies on the synthesis and characterization of carboxymethylcellulose", Die Angewandte Makromolekulare Chemie, 266, 1999, pp. 37-45.
Prashant D. Pandya et al., "Synthesis and characterization of Sodium salt of partially carboxymethylated starch", International Journal of Polymeric Materials, 51, 12, 2002, pp. 1081-1085.
Y. Ke et al., "Preparation of carboxymethyl cellulose based microgels for cell encapsulation", Express Polymer Letters, vol. 8, Issue 11, 2014, pp. 841-849.
Office Action (Notification of Defects) dated Jan. 14, 2020 for Israeli Patent Application No. 251831 (with English translation).
Office Action dated Nov. 25, 2019 for Chinese Patent Application No. 201580068590.4 (with English translation).
Second Office Action dated Jul. 30, 2020 for Chinese Patent Application No. 201580068590.4.

* cited by examiner

*Primary Examiner* — Shaojia A Jiang
*Assistant Examiner* — Everett White
(74) *Attorney, Agent, or Firm* — Potomac Law Group, PLLC; Jeremy Cubert

(57) ABSTRACT

Provided is a method for producing a cellulose derivative. The method includes forming a first reaction product by reacting non-oxidized cellulose with at least one first alkalization agent in the presence of at least one suitable solvent, wherein the first reaction product includes a non-oxidized alkali-cellulose. The method further includes forming a second reaction product by reacting a monohalo-organic compound with a second alkalization agent in a solution, wherein the second reaction product includes a saturated solution and a sediment. The method further includes increasing a temperature of the saturated solution and dissolving at least a portion of the sediment, and reacting the non-oxidized alkali-cellulose with the second reaction product to form an improved carboxymethyl cellulose.

33 Claims, 9 Drawing Sheets

100

200

300

400

600

700

702

CARBOXYMETHYL CELLULOSE AND METHOD OF PREPARATION

CROSS-REFERENCE TO RELATED APPLICATIONS

This application is a U.S. National Stage application of International Application No. PCT/IB2015/058407 filed 30 Oct. 2015, which claims priority to U.S. Provisional Application No. 62/073,798 filed 31 Oct. 2014, the entire disclosures of which are hereby incorporated by reference in their entireties.

BACKGROUND

Field of the Disclosure

The present disclosure relates generally to cellulose derivatives, and more particularly, to chemical modifications of non-oxidized cellulose to produce improved carboxymethyl cellulose.

Background Information

Cellulose is a natural polymer derived from D-glucose units, which are fused through $\beta(1\rightarrow 4)$ glycosidic bonds, and which confer a linear structure to cellulose. Many properties of cellulose depend on the polymer chain length (e.g., the number of glucose molecules forming the polymer). This polymer chain length is also known as the degree of polymerization (DP).

Oxidation reaction of cellulose involves the primary and secondary hydroxyl groups of the pyranose ring and results in carbonyl groups and carboxyl groups. This oxidation reaction can be accompanied by the opening of the pyranose ring. When the pyranose ring is opened, the glycosidic bond becomes weaker and the formation of carboxyl groups induces a depolymerization (e.g., the process of converting a polymer into a monomer or a mixture of monomers), thereby reducing DP as well as the physical and mechanical strength of the polymer.

Additionally, cellulose can be chemically modified to yield cellulose derivatives that are used widely in different industrial sectors. Cellulose derivatives can be produced under heterogeneous or homogeneous reaction conditions. The major drawbacks of heterogeneous phase reactions are the limited reaction rates and lack of regioselectivity. The ramification of these drawbacks is that the accessibility of free hydroxyl groups of cellulose is the determining factor for selectivity as well as for the degree of substitution (DS).

Because carboxymethyl cellulose is one of the most significant water-soluble cellulose derivatives, it may be used for many applications in a number of industries due to its non-toxic and biodegradable properties. Physical and chemical properties of carboxymethyl cellulose are mainly determined by DS, distribution of substituents, and DP. Among these properties, DS and homogeneity of substituent distribution along carboxymethyl cellulose chains have greater influence on the solubility, shearing stability and rheological behavior of carboxymethyl cellulose solution and its stability against temperature and low molecular additives. Accordingly, it would be beneficial to produce carboxymethyl cellulose with improved chemical and physical properties.

SUMMARY

In an embodiment there is a method for producing a cellulose derivative. The method includes forming a first reaction product by reacting non-oxidized cellulose with at least one first alkalization agent in the presence of at least one suitable solvent, wherein the first reaction product includes a non-oxidized alkali-cellulose. The method further includes forming a second reaction product by reacting a monohalo-organic compound with a second alkalization agent in a solution, wherein the second reaction product includes a saturated solution and a sediment. The method further includes increasing a temperature of the saturated solution and dissolving at least a portion of the sediment, and reacting the non-oxidized alkali-cellulose with the second reaction product to form an improved carboxymethyl cellulose.

In an embodiment there is a method for producing a cellulose derivative. The method includes forming a reaction product by reacting non-oxidized cellulose with at least one alkalization agent in the presence of at least one suitable solvent, wherein the reaction product comprises a non-oxidized alkali-cellulose. The method includes forming a saturated solution by adding a salt form of a monohalo-organic compound to the reaction product, the saturated solution comprising a sediment. The method includes heating the saturated solution to a temperature sufficient to dissolve at least a portion of the sediment, and reacting the non-oxidized alkali-cellulose with a dissolved portion of the sediment to form an improved carboxymethyl cellulose.

The structure of the cellulose derivative produced by methods described herein comprises an improved carboxymethyl cellulose that preserves the cellulosic backbone length and its integrity while introducing additional side chains of $CH_2CO_2Na$. Further, the improved carboxymethyl cellulose obtainable by the disclosed method is bioabsorbable, biodegradable, and biocompatible, thereby allowing the improved carboxymethyl cellulose to be used as a raw material for a plurality of applications.

Numerous other aspects, features, and benefits of the present disclosure are made apparent from the following detailed description.

BRIEF DESCRIPTION OF THE DRAWINGS

The present disclosure can be better understood by referring to the following figures. The components in the figures are not necessarily to scale, emphasis instead being place upon illustrating the principles of the disclosure. In the figures, reference numerals designate corresponding parts throughout the different views.

DETAILED DESCRIPTION

Figure 1:
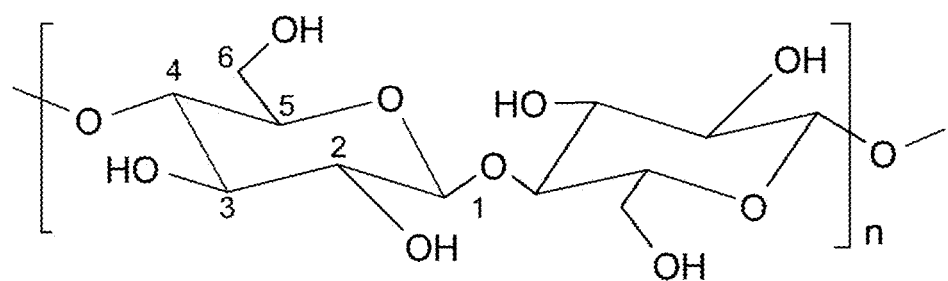
FIG. 1 is a graphical representation illustrating a molecular structure diagram of a cellulose molecule, according to an embodiment.

The present disclosure is here described. Other embodiments are used and/or other changes are made without departing from the spirit or scope of the present disclosure. The illustrative embodiments described in the detailed description are not meant to be limiting of the subject matter presented here.

Definitions

As used here, the following terms have the following definitions:

"Alkalization agent" refers to an alkali metal hydroxide or alkaline earth metal hydroxide that is used for activating the non-oxidized cellulose.

"Degree of substitution (DS)" refers to the average number of hydroxyl (OH) groups that have been substituted in one anhydroglucose unit.

"Improved carboxymethyl cellulose" refers to a non-oxidized cellulose derivative with a carboxymethyl group (—$CH_2$—COOA) bound to at least one OH group of the glucopyranose monomers that make up the cellulose backbone. A is hydrogen, a mono-, di-, or tri-valent cations, such as, for example $Na^+$, $K^+$, $Ca_{+2}$, $Al_{+3}$, $Ag^+$, and the like.

"Non-oxidized cellulose" refers to cellulose that has not yet undergone modifications by oxidation. The oxidation process can be performed in three places: a) on the OH groups, (b) on the pyranose ring, or (c) in between the chains (opening the etheric connections and shortening the chain length).

"Regenerated cellulose" refers to cellulose that has been prepared by regeneration (e.g., returned to solid form) from a solution that includes dissolved cellulose fibers.

"Suitable solvent" refers to a solvent where the interactions between polymer segments and solvent molecules are energetically favorable than the polymer-polymer self-interactions. The quality of the solvent depends on the chemical compositions of the polymer and solvent molecules as well as the solution temperature.

DESCRIPTION OF THE DISCLOSURE

The present disclosure is directed to methods for producing improved carboxymethyl cellulose comprising the steps of (a) reacting non-oxidized cellulose with an alkalization agent in the presence of suitable solvents (alkalizing step) to produce a non-oxidized alkali-cellulose, (b) adding monohaloacetic acid or a salt thereof to the products of step (a), and further re-dissolving the resulting sediment, which may be a monochloroacetate salt such as sodium monochloroacetate (dissolution step), and (c) reacting the non-oxidized alkali-cellulose with sodium monochloroacetate (etherification step). In other words, in some embodiments, a method for producing a cellulose derivative, includes forming a first reaction product by reacting non-oxidized cellulose with at least one of a first alkalization agent in the presence of at least one suitable solvent, wherein the first reaction product comprises a non-oxidized alkali-cellulose; forming a second reaction product by reacting a monohalo-organic compound with a second alkalization agent in a solution; and reacting the non-oxidized alkali-cellulose with the second reaction product to form a carboxymethyl cellulose, such as an improved carboxymethyl cellulose.

In some embodiments, the raw material used for producing improved carboxymethyl cellulose is natural cellulose. In other embodiments, the raw material used for producing improved carboxymethyl cellulose is non-oxidized regenerated cellulose. In these embodiments, the natural cellulose or non-oxidized regenerated cellulose used is amorphous, crystalline, or a combination thereof. Further to these embodiments, the non-oxidized regenerated cellulose exhibits a higher degree of uniformity when compared to non-regenerated cellulose.

In some embodiments, the non-oxidized cellulose is alkalized in the presence of suitable solvents, for example, to form a first reaction product. In these embodiments, suitable solvents include water, ethanol, toluene, acetone, 2-propanol, or a mixture thereof, among others. In an example, water and ethanol are employed as suitable solvents.

In some embodiments, the alkalization agent may be at least one first alkalization agent. In some embodiments the alkalization agent may be a second alkalization. In some embodiments, alkalization agent, such as the first alkalization, the second alkalization or both the first and second alkalization agents, may include sodium hydroxide (NaOH), potassium hydroxide (KOH), calcium hydroxide ($Ca(OH)_2$), or a mixture thereof. In some embodiments, the first alkalization agent and the second alkalization agent are the same alkalization agent. In an example, NaOH is employed as the alkalization agent, for example, as the first alkalization agent, as the second alkalization or as both the first and the second alkalization agents. In some embodiments, the first alkalization agent is different than the second alkalization agent.

In some embodiments, forming the first reaction product comprises the alkalizing step which may be performed by adding varying amounts of the alkalization agent, for example, NaOH, solution to a slurry of non-oxidized natural or regenerated cellulose in a suitable solvent, such as a water/ethanol mixture, with the process carried-out at a first temperature, such as, ranging from about room temperature (e.g., 25° C.) to about 45° C. In these embodiments, the amount of non-oxidized natural or regenerated cellulose in the slurry of non-oxidized natural or regenerated cellulose within the water/ethanol/NaOH mixture is preferably within the range from about 0.1 to about 40 weight %, more preferably from about 2.0 to about 10 weight %, and most preferably from about 2.0 to about 5.0 weight %, each based on the total weight of non-oxidized natural or regenerated cellulose and water/ethanol/NaOH mixture.

In an example, the non-oxidized cellulose is soaked in an 11% w/w NaOH solution (e.g., about 11% $NaOH_{(s)}$, about 21% water, and about 68% ethanol) at about 25° C. for a plurality of reaction times until the non-oxidized cellulose is converted into non-oxidized alkali-cellulose (Cell-O$^-$Na$^+$).

In some embodiments and during the alkalizing step, the crystalline structure of the non-oxidized cellulose is modified, and thus crystalline structure accessibility to chemicals increases by swelling. In these embodiments, the changes in crystallinity and polymorphism are due to the partition of NaOH between the reaction medium and the non-oxidized cellulose chain. Further to these embodiments, the non-oxidized cellulose can be swollen in concentrated NaOH, but not dissolved.

In some embodiments, the method may include reacting a monohalo-organic compound with an alkalization agent in a solution to form a second reaction product which may comprise a saturated solution and a sediment. In an example, the second reaction product may comprise a saturated solution and sediment, which may be a monochloroacetate salt sediment such as a sodium monochloroacetate sediment. Forming the second reaction product may comprise the dissolution step which may be performed by employing the monohalo-organic compound. In these embodiments, the monohalo-organic compound is implemented as, for example, a monohaloacetic acid. Further to these embodiments, the monohaloacetic acid can be implemented as, for example, a free acid or as one of its salt forms during the dissolution step. Still further to these embodiments, the monohaloacetic acid may be employed as, for example, monochloroacetic acid ($ClCH_2COOH$). In an example, one salt form of the monohaloacetic acid is monochloroacetate. In this example, the aforementioned salt can be added directly during the dissolution step. Further to this example, the aforementioned salt can be added all at once or in lesser amounts/portions over time.

In some embodiments, the monochloroacetic acid solution is mixed with NaOH solution in the presence of the non-oxidized alkali-cellulose (Cell-$O^-Na^+$). In these embodiments, the chemical reaction of the monochloroacetic acid solution and NaOH solution produces a saturated solution comprising a sodium monochloroacetate ($ClCH_2COONa$) sediment and water.

In some embodiments and throughout the dissolution step, the sediment, which may be a monochloroacetate salt sediment such as a sodium monochloroacetate sediment, is constantly re-dissolved into the saturated solution maintaining a constant concentration of the sodium monochloroacetate in said solution. In these embodiments, the dissolution of sodium monochloroacetate sediment is improved by applying temperature at about 50° C. Further to these embodiments, the dissolution of the aforementioned sediment into the saturated solution enables to employ lower reagent concentrations, as well as increase the yields of the overall chemical reaction. In these embodiments, the saturated solution is employed in the etherification (carboxymethylation) step.

In some embodiments, the method may include reacting the non-oxidized alkali-cellulose with the second reaction product to form a third reaction product, for example, a carboxymethyl cellulose which may be an improved carboxymethyl cellulose. Forming the third reaction product may comprise the etherification step which may be performed by adding varying amounts of sodium monochloroacetate to non-oxidized alkali-cellulose to produce improved carboxymethyl cellulose, with the process carried-out at a temperature from about 40° C. to about 60° C., being preferred at about 50° C.

In some embodiments, the non-oxidized cellulose treated in this manner produces improved carboxymethyl cellulose having a degree of substitution (DS) of about 0.88. In these embodiments, the structure of the improved carboxymethyl cellulose preserves the cellulosic backbone length and its integrity while introducing additional side chains of $CH_2CO_2Na$. Further to these embodiments, the additional side chains of $CH_2CO_2Na$ bind to one of the possible three hydroxyl groups of each repeating unit. In these embodiments, every side chain introduces an ionic end group of a carboxyl group ($COO^-$) with a counter ion of $Na^+$.

In some embodiments, when the improved carboxymethyl cellulose comes in contact with aqueous fluids the polymer interacts with water due to the polar ion groups on the side chains. In these embodiments, the aforementioned interaction results in dissociation of the $Na^+$ counter ions, thereby leaving a negative carboxyl group bound covalently to the backbone of the polymer.

In other embodiments, mono-, di-, or tri-valent cations, such as, for example $K^+$, $Ca^{+2}$, $Al^{+3}$, $Ag^+$, and the like are employed to form additional side chains of the cellulosic backbone.

In some embodiments, the etherification step is part of the process of the substitution of the functional groups to produce improved carboxymethyl cellulose. In other embodiments, the etherification step can produce other cellulose derivatives in the same mode of operation by using other monohalo-organic compounds.

In some embodiments, further chemical reactions allowing the formation of other types of cellulose derivatives take place once the non-oxidized cellulose is in a swollen state (after NaOH immersion). In these embodiments, the nature of the bound side chain will define the kind of cellulose derivatives that can be synthesized.

The improved carboxymethyl cellulose obtainable by the disclosed method is bioabsorbable, biodegradable, and biocompatible, thereby allowing the improved carboxymethyl cellulose to be used as a raw material for a plurality of applications. In an example, the improved carboxymethyl cellulose is used as a raw material in the manufacturing of hemostatic devices.

Raw Materials

In some embodiments, the raw material used for producing improved carboxymethyl cellulose is natural cellulose. In other embodiments, the raw material used for producing improved carboxymethyl cellulose is non-oxidized regenerated cellulose. In these embodiments, the natural cellulose or non-oxidized regenerated cellulose used is amorphous, crystalline, or a combination thereof. Further to these embodiments, the non-oxidized regenerated cellulose exhibits a higher degree of uniformity when compared to non-regenerated cellulose.

In some embodiments, the cellulose is built from glucose units that have a basic molecular format of $C_6H_{10}O_6$ and is also called an anhydroglucose unit (AGU). In these embodiments, the AGU is the fundamental repeating structure of cellulose and has three hydroxyl groups. Further to these embodiments, the cellulose molecule is linked in the form of β-1, 4-glucan to produce long cellulose chains, as illustrated bellow in FIG. 1.

FIG. 1 is a graphical representation illustrating a molecular structure diagram of a cellulose molecule, according to an embodiment. In FIG. 1, the cellulose is derived from D-glucose units that condense through β(1→4)-glycosidic bonds. In some embodiments, the cellulose is a straight chain polymer and the multiple hydroxyl groups within the glucose from one chain form hydrogen bonds with oxygen atoms on the same or on a neighboring chain. In these embodiments, aforementioned hydrogen bonds hold the chains firmly together, side-by-side, to form stable crystalline regions, thereby resulting non-oxidized cellulose insoluble in water as well as in aqueous solutions.

Preparation Method

Alkalizing Step

In some embodiments, the non-oxidized cellulose is alkalized with an alkalizing agent, such as at least one of a first alkalizing agent, in the presence of suitable solvents. In these embodiments, the alkalization agent is described as above and may be sodium hydroxide (NaOH), potassium hydroxide (KOH), calcium hydroxide (Ca(OH)$_2$), or a mixture thereof. In an example, NaOH is employed as the alkalization agent. Further to these embodiments, suitable solvents include water, ethanol, toluene, acetone, 2-propanol, or a mixture thereof, among others. In an example, water and ethanol are employed as suitable solvents.

In some embodiments, the alkalizing step is performed by adding varying amounts of NaOH solution to a slurry of non-oxidized natural or regenerated cellulose in a water/ethanol mixture, with the process carried-out at a first temperature, such as, ranging from about room temperature (e.g., 25° C.) to about 45° C. In these embodiments, the amount of non-oxidized natural or regenerated cellulose in the slurry of non-oxidized natural or regenerated cellulose within the water/ethanol/NaOH mixture is preferably within the range from about 0.1 to about 40 weight %, more preferably from about 2.0 to about 10 weight %, and most preferably from about 2.0 to about 5.0 weight %, each based on the total weight of non-oxidized natural or regenerated cellulose and water/ethanol/NaOH mixture.

In some embodiments, the individual components (e.g., non-oxidized cellulose, NaOH, water, and ethanol) can be added in any order during the alkalizing step. In other embodiments, the non-oxidized cellulose is combined with water/ethanol mixture in a first step, and the NaOH is then added in a subsequent step.

Figure 2:
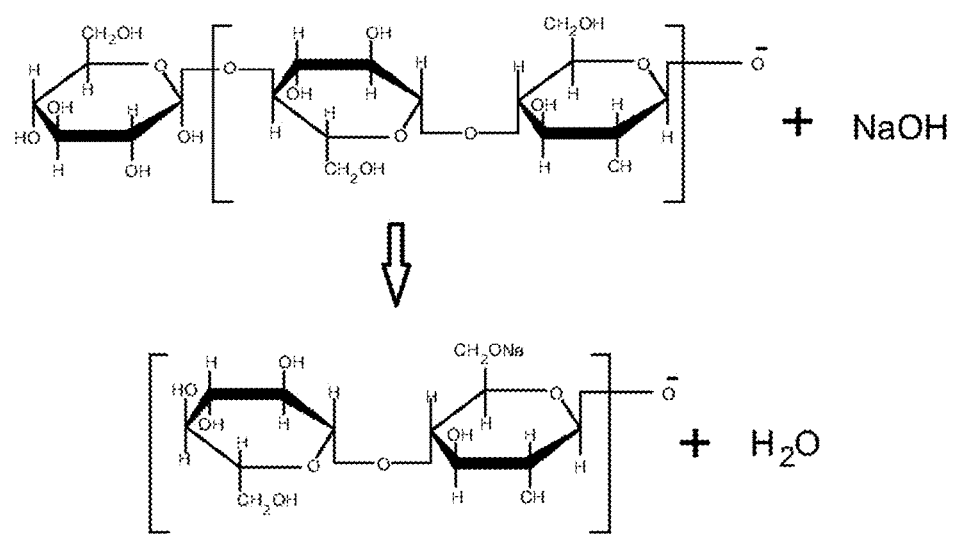
FIG. 2 is a graphical representation illustrating a reaction mechanism diagram of an alkalizing step of a non-oxidized cellulose molecule, according to an embodiment.

FIG. 2 is a graphical representation illustrating a reaction mechanism diagram of an alkalizing step of a non-oxidized cellulose molecule, according to an embodiment. In FIG. 2, the non-oxidized cellulose is in contact with a NaOH solution.

In an example, the non-oxidized cellulose is soaked in an 11% w/w NaOH solution (e.g., about 11% NaOH$_{(s)}$, about 21% water, and about 68% ethanol) at about 25° C. for a plurality of reaction times until the non-oxidized cellulose is converted into non-oxidized alkali-cellulose (Cell-O$^-$Na$^+$), as illustrated below in FIG. 2.

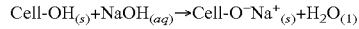

Cell-OH$_{(s)}$+NaOH$_{(aq)}$→Cell-O$^-$Na$^+$$_{(s)}$+H$_2$O$_{(l)}$

In some embodiments and during the alkalizing step, the crystalline structure of the non-oxidized cellulose is modified, and thus crystalline structure accessibility to chemicals increases by swelling. In these embodiments, the changes in crystallinity and polymorphism are due to the partition of NaOH between the reaction medium and the non-oxidized cellulose chain. Further to these embodiments, the non-oxidized cellulose can be swollen in concentrated NaOH, but not dissolved.

Dissolution Step

In some embodiments, a monohalo-organic compound is employed during the dissolution step. In these embodiments, the monohalo-organic compound is implemented as a monohaloacetic acid. Further to these embodiments, the monohaloacetic acid can be implemented as a free acid or as one of its salt forms during the dissolution step. Still further to these embodiments, the monohaloacetic acid is employed as monochloroacetic acid (ClCH$_2$COOH). In an example, one the salt forms of the monohaloacetic acid is monochloroacetate. In this example, the aforementioned salt can be added directly during this step. Further to this example, the aforementioned salt can be added all at once or in lessor amounts/portions over time.

In an example, a monochloroacetic acid solution comprises: about 3.6 weight parts of soft water, about 53.6 weight parts of absolute ethanol, and about 42.8 weight parts of monochloroacetic acid in the form of flakes.

In some embodiments, the monochloroacetic acid solution is mixed with an alkalization agent, for example, a second alkalization agent which may be an NaOH solution in the presence of the non-oxidized alkali-cellulose (Cell-O$^-$Na$^+$). In these embodiments, the chemical reaction of the monochloroacetic acid solution and NaOH solution (see below) produces a saturated solution comprising a sodium monochloroacetate (ClCH$_2$COONa) sediment and water.

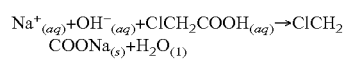

Na$^+$$_{(aq)}$+OH$^-$$_{(aq)}$+ClCH$_2$COOH$_{(aq)}$→ClCH$_2$COONa$_{(s)}$+H$_2$O$_{(l)}$

In some embodiments and throughout the dissolution step, the sodium monochloroacetate sediment is constantly re-dissolved into the saturated solution maintaining a constant concentration of a dissolved portion of the sodium monochloroacetate in the saturated solution. In these embodiments, the dissolution of sodium monochloroacetate sediment is improved by applying temperature at about 50° C. Further to these embodiments, the dissolution of a portion of the aforementioned sediment into the saturated solution enables to employ lower reagent concentrations, as well as increase the yields of the overall chemical reaction. In these embodiments, the saturated solution is employed in the etherification (carboxymethylation) step.

In some embodiments, NaOH is consumed in said chemical reaction, which means that the initial amount has to be sufficiently large such that NaOH is present in sufficient amount to maintain an alkaline pH throughout the remaining process steps.

Etherification Step

Figure 3:
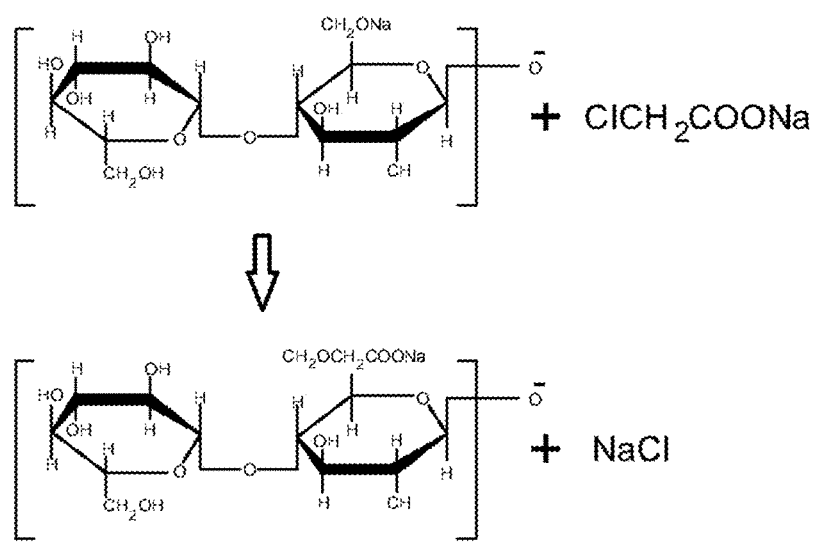
FIG. 3 is a graphical representation illustrating a reaction mechanism diagram of an etherification step performed on a non-oxidized alkali-cellulose molecule, according to an embodiment.

In some embodiments, the etherification step, as illustrated in FIG. 3, is performed by reacting varying amounts of sodium monochloroacetate (ClCH$_2$COONa) with non-oxidized alkali cellulose (Cell-O$^-$Na$^+$) to produce improved carboxymethyl cellulose, with the process carried-out at a temperature from about 40° C. to about 60° C., being preferred 50° C.

FIG. 3 is a graphical representation illustrating a reaction mechanism diagram of an etherification step performed on a non-oxidized alkali-cellulose molecule, according to an embodiment. In FIG. 3, the improved carboxymethyl cellulose prepared by reacting non-oxidized alkali-cellulose with sodium monochloroacetate employs the "alkali consumption reaction" mechanism. The methylation proceeds as a nucleophilic substitution caused by the interaction of the oxonium sodium hydroxide complexes, contained on accessible cellulose hydroxyls, with methyl halide.

In some embodiments, the non-oxidized cellulose treated in this manner produces improved carboxymethyl cellulose exhibiting a degree of substitution (DS) of about 0.88. In these embodiments, the structure of the improved carboxymethyl cellulose preserves the cellulosic backbone length and its integrity while introducing additional side chains of CH$_2$COONa. Further to these embodiments, the additional side chains of CH$_2$COONa bind to one of the possible three hydroxyl groups of each repeating unit. In these embodiments, every side chain introduces an ionic end group of a carboxyl group (COO$^-$) with a counter ion of Na$^+$.

In other embodiments, mono-, di-, or tri-valent cations, such as, for example $K^+$, $Ca^{+2}$, $Al^{+3}$, $Ag^+$, and the like are employed to form additional side chains of the cellulosic backbone.

In some embodiments, when the improved carboxymethyl cellulose comes in contact with aqueous fluids the polymer interacts with water due to the polar ion groups on the side chains. In these embodiments, the interaction results in dissociation of the $Na^+$ counter ions, thereby leaving a negative carboxyl group bound covalently to the backbone of the polymer. Therefore, a negatively charged chain is formed.

In some embodiments, the etherification step is part of the process of the substitution of the functional groups to produce improved carboxymethyl cellulose. In other embodiments, the etherification step can produce other cellulose derivatives in the same mode of operation by using other monohalo-organic compounds.

Figure 4:
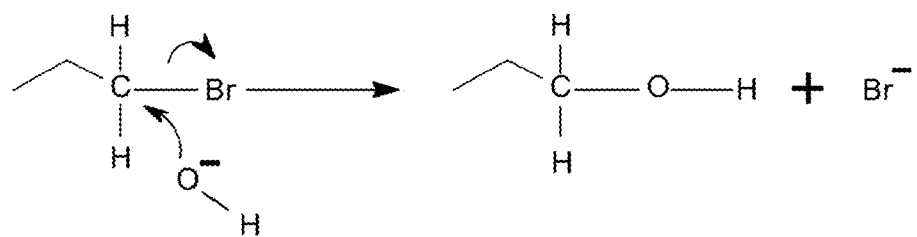
FIG. 4 is a graphical representation illustrating a reaction mechanism diagram of a nucleophilic substitution on a 1-bromopropane molecule, according to an exemplary embodiment.

In other embodiments, further chemical reactions to form any kind of cellulose derivatives take place once the non-oxidized cellulose is in the swollen state (after NaOH immersion). In these embodiments, the nature of the bound side chain will define the kind of cellulose derivatives that can be synthesized. Further to these embodiments, the hydroxyl groups (—OH) of the cellulose can be partially or fully reacted with various reagents to produce derivatives with useful properties, such as, for example cellulose esters and cellulose ethers, with cellulose ethers being predominant. In these embodiments, the method used to produce cellulose ethers is termed the "nucleophilic attack" and can be implemented with various halogen elements as illustrated in the example of FIG. 4. In an example, a 1-bromopropane molecule suffers a nucleophilic attack.

FIG. 4 is a graphical representation illustrating a reaction mechanism diagram of a nucleophilic substitution on a 1-bromopropane molecule, according to an exemplary embodiment. In FIG. 4, the oxygen of the hydroxide ion donates an electron pair to bond with the carbon at the end of the 1-bromoprapane molecule. The bond between the carbon and the bromine then undergoes heterolytic fission, with the bromine atom taking the donated electron and becoming the bromide ion (Br). The bromine atom takes the donated electron since a $S_N2$ reaction occurs by backside attack. A backside attack occurs when a hydroxide ion attacks the carbon atom from the other side, exactly opposite the bromide ion. Because of the backside attack, $S_N2$ reactions result in a reversal of the configuration of the electrophile. If the electrophile is chiral, it typically maintains its chirality, though the $S_N2$ product's configuration is flipped as compared to that of the original electrophile.

In the case of cellulose derivatives, the principle of up to 3 substitutions in one repeating unit is preserved since, like the improved carboxymethyl cellulose, the other derivatives also bind to the hydroxyl groups. Hence, according to the chemical reactions the products may have diverse values of DS. Therefore, each of the formed cellulose derivatives will have other kind of properties related to its chemical nature.

In some embodiments, cellulose derivatives are cellulose ethers, such as, for example methyl cellulose (MC), ethyl cellulose (EC), ethyl methyl cellulose, hydroxyethyl cellulose, hydoxypropyl cellulose (HPC), hydroxyethyl methyl cellulose, hydroxylpropylmethyl cellulose (HPMC), ethyl hydroxyethyl cellulose, and the like.

In some embodiments, the improved carboxymethyl cellulose obtainable by the disclosed method is bioabsorbable, biodegradable, biocompatible, or any combination thereof, thereby allowing the improved carboxymethyl cellulose to be used as a raw material for a plurality of applications. In an example, the improved carboxymethyl cellulose can be used as a raw material in the manufacturing of hemostatic devices, such as, for example a hemostatic gauze.

In some embodiments, the hemostatic gauze including improved carboxymethyl cellulose can be applied to a bleeding wound surface in humans and animals as a hemostatic agent for topical and surgical use. In these embodiments, the hemostatic gauze can be used on soft tissue to rapidly and effectively control bleeding without the need of application of pressure. In other embodiments, the hemostatic gauze is applied to promote healing in wounds or trauma resulting from skin graft surgery or from injured organs as a result of blunt and/or penetrating traumas. In these embodiments, the hemostatic gauze is applied to seal the local wound environment.

In other embodiments, the hemostatic gauze is designed to stop moderate to severe arterial and venous hemorrhaging without the need to compress directly onto the wound. In these embodiments, the hemostatic gauze is placed onto the wound and low pressure is applied for sufficient time for the hemostatic gauze to activate and further adhere to the wounded tissue. Further to these embodiments, the amount of time low pressure is applied during the placement of the hemostatic gauze depends of the type, size, and severity of the wound. In these embodiments, after the hemostatic device adheres to the wounded tissue, no further application of pressure is required, thereby avoiding further damaging the tissues.

In some embodiments, the hemostatic gauze comprises a hemodynamic polymer compound which upon activation exhibits both an ionic force as well as a capillary force when the hemodynamic polymer compound is exposed to blood/blood products. In these embodiments, exposure of the hemodynamic polymer compound to blood/blood products results in hydration of the hemodynamic polymer compound with the blood/blood products. Further to these embodiments, the hydration of the hemodynamic polymer compound with the blood/blood products results in the creation of attractive forces that provide an improved level of adherence to the hemostatic gauze thereby allowing the hemostatic gauze to attach itself to the damaged blood vessels and exposed tissue more easily. In an example, the attractive forces exhibited by the hemodynamic polymer compound when exposed to blood/blood products allows the hemostatic gauze to remain attached to the blood vessels and exposed tissue without the need of application of external pressure. In these embodiments, the improved level of adherence of the hemostatic gauze is due to the reaction of the hemostatic gauze to blood/blood products and is a property of the hemostatic gauze that is created during the manufacturing process. Examples of this adherence property include swelling of the fabric, wound contraction, and conductivity, among others.

In some embodiments, because of the adherence property of the improved hemostatic gauze (e.g., to attach itself to a wound), the need to apply pressure to the wound is reduced, even in cases of severe hemorrhage. In these embodiments, the hemostatic gauze can be placed onto the internal blood vessels of a wound without further compression, thereby avoiding further damaging the tissue. Further to these embodiments, the hemostatic gauze can be employed in external sensitive injury situations, such as, for example a nose bleed, soft tissues lacerations, external head injuries, compound fractures, and the like. In these embodiments, the improved hemostatic gauze can be formed into various shapes and sizes to fit into different wound cavities, such as, for example gunshot wounds and wounds caused by shrapnel as a result of an explosion.

In some embodiments, during the design of the hemostatic gauze the targeted working environment is considered. In these embodiments, the hemostatic gauze is applied into internal bleeding zones, which involve wet tissue surfaces. Further to these embodiments, the hemostatic gauze exhibits mucoadhesive properties. Still further to these embodiments, mucoadhesion of the hemostatic gauze involves two stages: contact and consolidation stages. In these embodiments, the contact stage involves an intimate contact (e.g., wetting) between the hemostatic gauze and mucous membranes. Further to these embodiments, the consolidation stage includes various physico-chemical interactions to consolidate and strengthen the adhesive joint, thereby leading to stronger and prolonged adhesion.

In some embodiments, the hemostatic gauze accomplishes the contact stage of mucoadhesion as follows. In these embodiments, the woven structure of the hemostatic gauze enables easy application onto the wound surface. Further to these embodiments, when the hemostatic gauze is exposed to blood/blood products, the blood/blood products initially fill the cavities within the fabric of the gauze and come in contact with the yarns that make up the fabric. Still further to these embodiments, the yarns absorb blood/blood products and swell while capillary forces act in-between the yarn strands to coalesce the whole structure into one homogeneous unit. In these embodiments, the contact stage causes moderate surface shrinkage of the hemostatic gauze, which increases the contact area between the wet tissue and the hemostatic gauze.

In some embodiments, the consolidation stage of the hemostatic gauze occurs when the hemostatic gauze, capable of rapid gelation in an aqueous environment, absorbs a specific amount of blood/blood products. In these embodiments, water (within the blood/blood products) movement occurs through the contact surface due to the hydrophilic properties of the hemostatic gauze. Further to these embodiments, the hemostatic gauze forms a polar polymeric gel, thereby exhibiting strong affinity for water, high osmotic pressure, and a large swelling force. In these embodiments, upon contact with the bleeding tissue, the hemostatic gauze dehydrates the tissue surface, absorbs the water and swells, and forces the hemostatic gauze against the tissue surface based on the swelling force.

In some embodiments, the hemodynamic polymer compound within the improved hemostatic gauze possesses characteristics associated with rounded shape yarns and fabrics having increased density. In these embodiments, these possessed characteristics (e.g., the rounded shape of yarns and the increased density fabric) provide increased surface area. Further to these embodiments, the increased surface area improves the contact between the hemodynamic polymer compound and the blood from the wound site.

In other embodiments, high levels of absorption are obtained by the hemostatic gauze due to its molecular stability. In these embodiments, the high levels of absorption of the hemostatic gauze allow for the swelling of the fabric and the associated absorption of large amounts of fluid. Further to these embodiments, the increased swelling of the hemostatic gauze allows higher levels of contraction of the fabric. In these embodiments, the higher levels of contraction of the fabric within the hemostatic gauze improved the adherence of the hemostatic gauze to the wound. In some embodiments, the molecular stability of the hemostatic gauze maintains: the molecular chains in an unbroken state; the initial length of the fibers that were obtained from the raw materials; and the attractive forces introduced in the manufacturing process.

In some embodiments, when the hemostatic gauze comes into contact with blood, it forms a non-exothermic hemodynamic gel which absorbs substantial amounts of blood and promotes natural dynamic coagulation formation within a contained and focused area. In these embodiments, the hemodynamic gel adheres to the wound and creates pressure to seal it. Further to these embodiments, the hemodynamic gel is highly conductive and when in contact with the highly charged environment of an open wound creates a highly ionic environment. In these embodiments, the highly ionic environment possesses enough ionic force to cause the gel to attach to the wound. In some embodiments, the stable and yet flexible hemodynamic gel retains its integrity for an extended period of time and can be removed easily with water or saline. In these embodiments, the improved hemostatic gauze dissolves into the body at a rate determined by the amount of blood absorbed and the wetness associated to the surrounding wound area.

In some embodiments, the hemostatic gauze is designed as a sterile gauze intended for wound packing to aid in achieving effective hemostasis. In these embodiments, the gauze is a single-use product made of chemically treated non oxidized cellulose. Further to these embodiments, the hemostatic gauze can be used in combination with other bandages, such as, for example gauze bandages, triangular bandages, tube bandages, pressure bandages, and the like.

In some embodiments, in order to enhance the safety of applying the hemostatic gauze to wound surfaces, tissue, etc., the hemostatic gauze can be packaged and sterilized using one or more known sterilization methods, such as, for example gamma irradiation, oxirane, and ozone sterilization.

In some embodiments, the hemostatic gauze can be manufactured in different shapes and sizes to fit in different types of wounds. In an example, the hemostatic gauze is manufactured with a width from about 2.5 cm to about 10 cm, a length from about 2.5 cm to about 100 cm, and having a weight from about 0.5 g to about 22 g.

In some embodiments, the improved hemostatic gauze is used to stop external bleeding occurring from an open wound without the need of the application of pressure. In these embodiments, external bleeding includes artery bleeding, vein bleeding and capillary bleeding. Further to these embodiments, the improved hemostatic gauze is used as topical dressings for local management of bleeding wounds, such as, for example cuts, lacerations and abrasions, and for use as a temporary treatment of moderate to severely bleeding wounds, such as surgical wounds (operative, postoperative, donor sites, dermatological) and traumatic injuries. In other embodiments, the improved hemostatic gauze is used to stop hemorrhage occurring due to injured organs during blunt and/or penetrating traumas.

Mode of Action

In some embodiments, the hemostatic device is chemically and physically designed to optimize the critical aspects of hemorrhage control. In these embodiments, the hemostatic device is activated when applied to a bleeding site. Further to these embodiments, the activated hemostatic device transforms into a viscous hydrogel. Still further to these embodiments, the formed hydrogel possesses mucoadhesive properties with sufficient tensile strength to stem the blood flow even under severe bleeding. In these embodiments, the hydrogel attaches to the surfaces of the bleeding site using various physical, biological and chemical means. Further to these embodiments, the formed hydrogel promotes the natural clotting mechanism for sufficient time to form a stable clot, thereby improving the clotting process. Still further to these embodiments, the stable yet flexible hydrogel retains its integrity for at least 24 hours after application and can be easily, safely and completely removed with water or saline. In other embodiments, in internal and subcutaneous applications, the formed hydrogel undergoes complete bio-degradation upon 7 days without inflammatory reaction at the application site.

In some embodiments, the mode of action of the hemostatic gauze can be divided into several primary mechanisms, such as, for example bio-adhesion to living tissue, increased absorption capacity and creation of hemodynamic environment, clotting promotion, and bio-absorbability. In these embodiments, these aforementioned primary mechanisms work in great synergy, thereby optimizing the wound care treatment.

Bio-Adhesion to Living Tissue

In some embodiment, during the design of the hemostatic gauze the target-working environment is considered. In these embodiments, the hemostatic gauze is applied into internal bleeding zones, which involves wet tissue surfaces. Further to these embodiments, the hemostatic gauze exhibits mucoadhesive properties. Still further to these embodiments, mucoadhesion of the hemostatic gauze involves two stages: contact and consolidation stages. In these embodiments, the contact stage involves an intimate contact (e.g., wetting) between the hemostatic device and mucous membranes. Further to these embodiments, the consolidation stage includes various physico-chemical interactions to consolidate and strengthen the adhesive joint, thereby leading to stronger and prolonged adhesion.

In some embodiments, the hemostatic gauze accomplishes the aforementioned two stages of mucoadhesion. In these embodiments, the woven structure of the hemostatic gauze enables easy application onto the wound surface. Further to these embodiments, when the hemostatic gauze is exposed to blood/blood products, the blood/blood products initially fill the cavities within the fabric and come in contact with the yarns. Still further to these embodiments, the yarns absorb blood/blood products and swell while capillary forces act in-between to coalesce the whole structure into one homogeneous unit. In these embodiments, the contact stage causes moderate surface shrinkage, which increases the contact between the wet tissue and the hemostatic gauze.

In some embodiments, the consolidation stage of the hemostatic gauze occurs when the material, capable of rapid gelation in an aqueous environment, is brought into contact with the wetted surface of the wound site. In these embodiments, water movement occurs through the contact surface due to the hydrophilic properties of the hemostatic gauze. Further to these embodiments, the hemostatic gauze turns into a polar polymeric gel, thereby exhibiting strong affinity for water, high osmotic pressure, and large swelling force. In these embodiments, the hemostatic gauze upon contact with the bleeding tissue dehydrates the surface and forces consolidation of the joint.

Absorption and Hemo-Dynamic Environment of the Hemostatic Gauze

Figure 5:
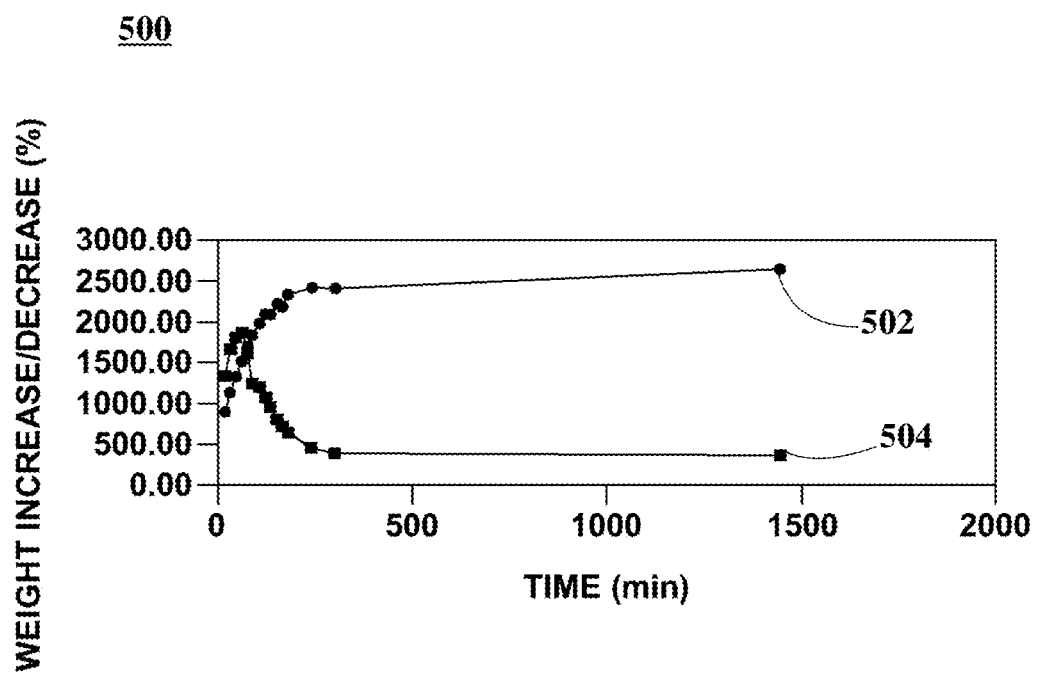
FIG. 5 is a graphical representation illustrating the average water uptake of a sample of the disclosed non-oxidized hemostatic device and a sample of a conventional oxidized regenerated cellulose (ORC) hemostatic device, within an aqueous medium, according to an embodiment.

In some embodiments, the hemostatic gauze forms a hemodynamic gel when in contact with blood/blood products. In these embodiments, the hemodynamic gel absorbs large amounts of blood/blood products and allows natural dynamic coagulation to occur in a contained and focused area. Further to these embodiments, the hemostatic gauze possesses extensive absorption capabilities and preserves a stable hydrogel membrane during the time frame required for hemostasis. In these embodiments, the hemostatic gauze can absorb up to about 2500 percent of its own weight when fully immersed in aqueous media, as illustrated in FIG. 5. Further to these embodiments, the high uptake of liquids of the hemostatic gauze underlines the absorption capacities as well as the gel stability of the hemostatic gauze. In these embodiments, the formed hydrogel includes mostly the blood/blood products absorbed with relatively small amount of the polymeric structure that holds the complex together; therefore blood components preserve their natural surrounding with minimal interference from foreign materials.

Figure 7:
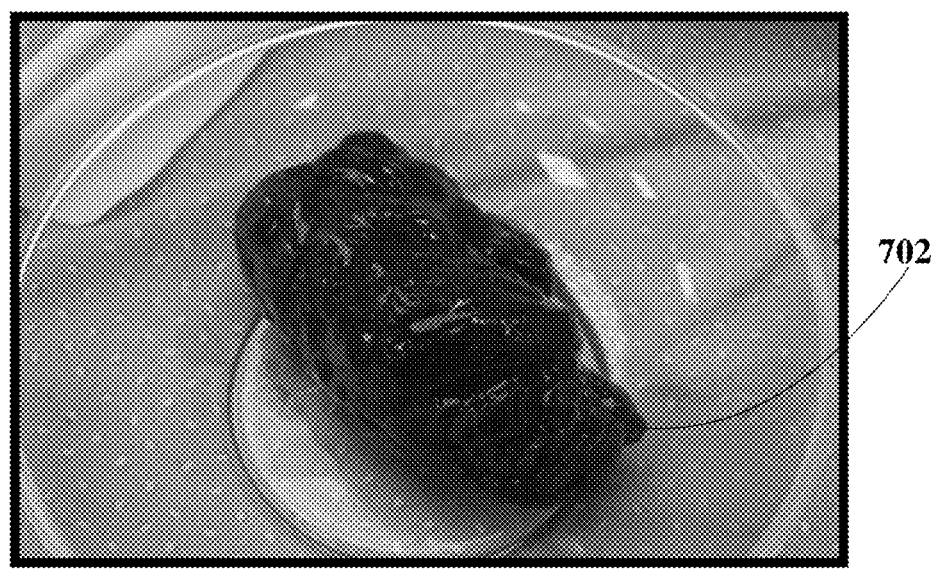
FIG. 7 is a photographic representation depicting a sample of the disclosed non-oxidized hemostatic device about 150 minutes after application in and removal from a swine femoral artery model, according to an embodiment.

In some embodiments, the hemodynamic gel forms a 3D matrix that entraps platelets and coagulation factors within a hemodynamic environment, thereby increasing the concentration of blood components near the vicinity of the wound while retaining their mobility and activity. In these embodiments, the hemodynamic gel maintains the platelets and coagulation factors within the gel and on the wound, thereby creating a biological clot. In an example, the formed biological clot within the hemostatic gauze after application is illustrated in FIG. 7.

Tests

Test 1. In Vivo Study to Evaluate the Efficacy of the Hemostatic Gauze in Non-Compression Hemorrhage Control Materials: 2 pieces of the hemostatic gauze of approximately 5×5 cm (2×2 inch.) for the first model, 2 pieces of the hemostatic gauze of approximately 10×10 cm (4×4 inch.) for the second model, and 1 piece of the hemostatic gauze of approximately 8×100 cm (3.5×40 inch.).

Test Model: Three animal models of groin injuries were selected for this study. The first model was a 3.5 cm lateral incision of the femoral artery. The second model was a full transection of the femoral artery and vessel. The third model was a full transection of the tissue, blood vessels and nerves across the groin.

Study Procedure

Three (3) White and Landrace cross-bred (male) swine, each with sizes ranging between 35-45 Kg and possessing normal coagulation functionality, had procedures performed on their associated groins. The animals were operated under general anesthesia and at least 15 seconds of free bleeding was allowed before applying the hemostatic gauze. All three animals were monitored with no further intervention beside fluid infusion.

In some embodiments, for the first animal model, an injury was prepared using a 3.5 cm lateral incision on the femoral artery. In these embodiments, two pieces of 5×5 cm of the hemostatic gauze were placed onto the wound site after 15 seconds of free bleeding. Further to these embodiments, the two pieces of the hemostatic gauze were held in the blood flow for a few seconds to allow the hemostatic gauze to absorb enough blood for activation. In these embodiments, no further external application of pressure was provided to the two pieces of hemostatic gauze and nothing further was added to the wound site to aid the hemostatic gauze.

In some embodiments, the two pieces of the hemostatic gauze adhered to the injured blood vessel of the femoral artery and remained attached regardless of the pressure associated with the blood flowing from the wound. In these embodiments, approximately 2 minutes after the application of the hemostatic gauze the blood flow from the wound was significantly reduced. Further to these embodiments, approximately 4 minutes after the application of the hemostatic gauze the blood flow from the wound was completely stopped. The results of this study are illustrated below in Table 1.

In other embodiments, for the second animal model a full transection of both the femoral artery and the nearby blood vessel was performed. In these embodiments, two pieces of 10×10 cm of the hemostatic gauze were placed onto the wound site after 25 seconds of free bleeding. Further to these embodiments, the two pieces of the hemostatic gauze were held in the blood flow for a few seconds to allow the hemostatic gauze to absorb enough blood for activation. In these embodiments, no further external application of pressure was provided to the two pieces of the hemostatic gauze and nothing further was added to the wound site to aid the hemostatic gauze.

In some embodiments, a sponge towel was placed on top of the hemostatic gauze and the wound to absorb the excess bleeding. In these embodiments, the two pieces of the hemostatic gauze adhered to the injured femoral artery and remained attached regardless of the pressure associated with the blood flowing from the wound. In these embodiments, upon the application of the hemostatic gauze the blood flow from the wound gradually reduced until it completely stopped after approximately 11 minutes. The results of this study are illustrated below in Table 1.

In still other embodiments, for the third animal model, the left thigh and groin of the swine was repeatedly stabbed by a scalpel transecting the tissue, blood vessels, and nerves across the groin. In these embodiments, one z-fold piece of 8×100 cm of the hemostatic gauze was packed into the wound for soaking with no application of pressure. Further to these embodiments, each fold of the hemostatic gauze was placed onto the wound for sufficient time to soak and then inserted into the wound cavity. In these embodiments, the hemostatic gauze was fully inserted into the wound cavity without the application of pressure.

In some embodiments, the hemostatic gauze adhered to the injured blood vessels and remained attached regardless of the pressure associated with the blood flowing from the wound. In these embodiments, upon the application of the hemostatic gauze the blood flow from the wound gradually reduced until it completely stopped after approximately 17. The results of this study are illustrated below in Table 1.

even in cases of severe bleeding without the need of application of pressure. The hemostatic gauze can be effectively employed in cases of severe traumatic injuries, including non-tourniquetable wounds, due to the exhibited non-compression property.

Test 2. Bio-Compatibility Test
Cytotoxicity Study

The disclosed hemostatic gauze was evaluated for potential cytotoxic effects following the guidelines of ISO 10993-5, Biological evaluation of medical devices-Part 5: Tests for in vitro cytotoxicity. A single preparation of the hemostatic gauze was extracted in single strength Minimum Essential Medium (1×MEM) at 37° C. for 24 hours. The negative control, reagent control, and positive control were similarly prepared. Triplicate monolayers of L-929 mouse fibroblast cells were dosed with each extract and incubated at 37° C. in the presence of 5% $CO_2$ for 48 hours. Following incubation, the monolayers were examined microscopically for abnormal cell morphology and cellular degeneration.

The hemostatic gauze extract showed no evidence of causing cell lysis or toxicity. Results were grade 0 (no reactivity) for all test articles, meeting the requirements of the test since the grade was less than a grade 2 (mild reactivity).

Irritation Study

The disclosed hemostatic gauze was evaluated for primary skin irritation in accordance with the guidelines of ISO 10993-10, Biological evaluation of medical devices—Part 10: Tests for irritation and skin sensitization. Two 25 mm×25 mm sections of the disclosed hemostatic gauze and control article were topically applied to the skin of each of three rabbits and left in place for a minimum of 23 hours and a maximum of 24 hours. The sites were graded for erythema and edema at 1, 24, 48 and 72 hours after removal of the single sample application.

Results were that all animals were clinically normal throughout the study. There was very slight erythema and no edema reactions observed on the skin of the animals treated with the hemostatic device. The Primary Irritation Index for the hemostatic device was calculated to be 0.0. The response of the disclosed hemostatic gauze was categorized as negligible.

Sensitization Study

The disclosed hemostatic gauze was evaluated for the potential to cause delayed dermal contact sensitization in a

TABLE 1

Non-compression hemorrhage control data.

| Model | Injury type | Model Injury | Hemostatic gauze dimensions | Time to hemostasis | Hemostasis upon removal |
|---|---|---|---|---|---|
| 1 | 3.5 cm linear incision | Femoral artery | 2 pieces of 5 × 5 cm | 4 min | Yes |
| 2 | Perpendicular transection | Femoral artery and venous | 2 pieces of 10 × 10 cm | 11 min | Yes |
| 3 | Stabbing thigh | Femoral artery, venous and nerves | 1 piece of 8 × 100 cm | 17 min | Yes |

Results: All animals were monitored after removal of the hemostatic gauze. In 100% of the cases, large clot formations were observed at the injured site and hemostasis was achieved. Additionally, the legs of the animals were moved and stretched to simulate walking in order to examine the bleeding control results after removal of the hemostatic gauze. A steady state was observed without new bleeding indicating the formation of natural clotting at the injured site.

Conclusions: The results of the study demonstrate the capability of the hemostatic gauze to control hemorrhages guinea pig maximization test. This study was conducted based on the requirements of ISO 10993-10, Biological evaluation of medical devices-Part 10: Tests for irritation and skin sensitization. Dose determination was performed to determine a suitable hemostatic gauze concentration for testing. The test solution was intradermally injected and occlusively patched to ten test guinea pigs. The control article was similarly injected and occlusively patched to five control guinea pigs. Following a recovery period, the test and control animals received challenge patches of the test solution and the control article. All sites were scored for dermal reactions at 24 and 48 hours after patch removal.

Results were that all animals were clinically normal throughout the study. The hemostatic gauze solution showed no evidence of causing delayed dermal contact sensitization in the guinea pig. The disclosed hemostatic gauze was not considered a sensitizer in the guinea pig maximization test.

Acute Systemic Toxicity Study

The disclosed hemostatic gauze was evaluated for acute systemic toxicity in mice. A single 20 mL/kg dose of the disclosed hemostatic gauze solution was injected into a group of five animals by the intravenous route. Similarly, a separate group of five animals were dosed with 0.9% sodium chloride USP solution as the control condition. The animals were observed immediately and at 4 hours after dosing and daily for 7 days. The animals were weighed prior to dosing and daily for 7 days thereafter.

Results were that all animal were clinically normal during the study. There was no mortality or evidence of systemic toxicity from the disclosed hemostatic gauze injected into the mice. The disclosed hemostatic gauze met the test requirements.

Conclusion: as demonstrated by testing, the disclosed hemostatic gauze can be considered biocompatible for its intended use applications.

Test 3. In Vitro Solubility Experiment in Water

Materials: 10 samples of the disclosed hemostatic gauze.

Methods:

Equipment: scissors, magnet plate and stirrer, 100 mL beaker, sterile water. Cut treated gauze to 5 cm×5 cm size.

Test Procedure: Fill the 100 mL beaker with 100 mL sterile water. Add a magnet stirrer into the water and set it at high speed. Place the sample inside the water. Observe its solubility after 30 min.

Results: A clear solution was obtained in all cases.

Conclusions:

The hemostatic gauze exhibits high solubility behavior in water, which indicates that the disclosed hemostatic gauze can be easily rinsed and removed from injuries.

Test 4. Water Uptake Comparison

Materials: 3 samples of the disclosed hemostatic gauze and 3 samples of conventional ORC hemostatic device (e.g., Benacel® hemostatic dressing, manufactured by Unicare Biomedical).

Statistical Analysis: Test results are calculated and presented as their mean value.

Method:

Equipment: Semi-Analytical Balance (±0.05 g), 50 mL Syringe cylinder (without a needle or its inner parts). Filter paper 110 mm (Whatman Cat. No. 1001-110 Particle Retention: 11 μm) 250 ml Cylinder, tweezers, stop watch, Reagents: deionized water.

Test Procedure: Fill the 250 mL cylinder with 250 mL of deionized water. Soak the filter paper with the deionized water. Weigh the syringe cylinder with the wet filter paper and record the value. Weigh a section of dry 5×5 cm hemostatic gauze and record the value. Place the hemostatic gauze onto the wet filter paper and center it on the wet paper filter, fold the exposed edges of the wet filter paper over the associated edges of the hemostatic gauze to form a sample hemostatic gauze, and roll the sample hemostatic gauze into a tight spiral for placement into the syringe, ensuring the hemostatic gauze is fully covered with the wet filter paper. The role of the wet filter paper is to confine the formed gel resulting from exposure of the hemostatic gauze to liquid, and to facilitate the measurement of the water uptake of the hemostatic gauze. Additionally, the wet filter paper remains permeable thereby allowing the associated dissolving polymeric chains to diffuse through the wet filter paper and into the aqueous medium. Place the syringe and the rolled hemostatic gauze sample into the 250 mL cylinder until it is fully immersed in the deionized water. Remove the syringe and the immersed hemostatic gauze sample from the deionized water after 15 minutes. Ensure all residual liquid is withdrawn from the syringe before weighing it per the schedule below, and return the syringe back to the 250 mL cylinder after each weighing. Weigh the syringe according to the following time schedule: during the first three hours, weigh every 15 minutes; after the first three hours, weigh every hour (for two measurements total); and leave the samples overnight for 19 hours with a final weighing at the 24 hour mark. In total, the hemostatic gauze sample is exposed to the deionized water for about 24 hours.

FIG. 5 is a graphical representation illustrating the average water uptake of a sample of the disclosed non-oxidized hemostatic gauze and a sample of a conventional oxidized regenerated cellulose (ORC) hemostatic device, within an aqueous medium, according to an embodiment. In FIG. 5, graph 500 includes curve 502 and curve 504. In some embodiments, curve 502 illustrates the average water uptake rate of the aforementioned non-oxidized regenerated cellulose hemostatic gauze. In these embodiments, curve 504 illustrates the average water uptake rate of a conventional ORC hemostat device.

In some embodiments, the average water uptake of rate curve 502 and rate curve 504 exhibit a substantially similar behavior from about 0 to about 100 minutes. In these embodiments, the water uptake of rate curve 504 dramatically decreases after about 100 minutes. Further to these embodiments, the water uptake of rate curve 502 increases after about 100 minutes and reaches a water uptake plateau of about 2,500 percent of its own weight at about 400 minutes and maintains that level of water uptake for about 1500 minutes (24 hours). In these embodiments and as illustrated in FIG. 5, the disclosed hemostatic gauze (rate curve 502) exhibits increased water absorption and enhanced membrane stability when compared to conventional ORC hemostats (rate curve 504).

Test 5. In Vivo Study to Evaluate Bleeding Control and Effectiveness of the Disclosed Hemostatic Gauze Materials: 8 pieces of the hemostatic gauze of approximately 5×5 cm (2×2 inch.), per each animal.

Model: The animal model selected for this study was the 6 mm femoral arteriotomy in domestic pigs, as described by Kheirabadi et al., "Development of a Standard Swine Hemorrhage Model for Efficacy Assessment of Topical Hemostatic Agents"; Journal of Trauma, 2011; 71: S139-S146.

Study Procedures

Five (5) White and Landrace cross-bred (male) swine with sizes ranging between 35-45 Kg and possessing normal coagulation functionality, each had procedures performed on its associated right femoral artery. The animals were operated on and treated in accordance with the Kheirabadi protocol, with minimal modifications.

According to the protocol, an animal will be considered as "surviving" if after 150 minutes post treatment it possesses both MAP and $ETCO_2$ values that are above the minimal requirements as stated in the original study protocol and illustrated below in Table 2.

TABLE 2

Protocol criteria for defining a surviving animal.
Parameters Criteria

| | |
|---|---|
| Duration of monitoring | 150 minutes survival time |
| MAP (Mean Arterial Pressure) | Above 20 mmHg |
| ETCO$_2$ (End-ridal CO$_2$) | Above 15 mmHg |

In summary, the animals were cannulated and continuously monitored (ECG and pulse rate, invasive arterial pressure, SpO$_2$, ETCO$_2$ and temperature). A cystotomy was then performed exposing the groin area and the femoral artery was carefully isolated, cleaned, and clamped. Blood tests (Complete Blood Count (CBC), coagulation profile, Arterial Blood Gas Count (ABG), and Activated Coagulation time (ACT)) were then taken per protocol.

Figure 6:
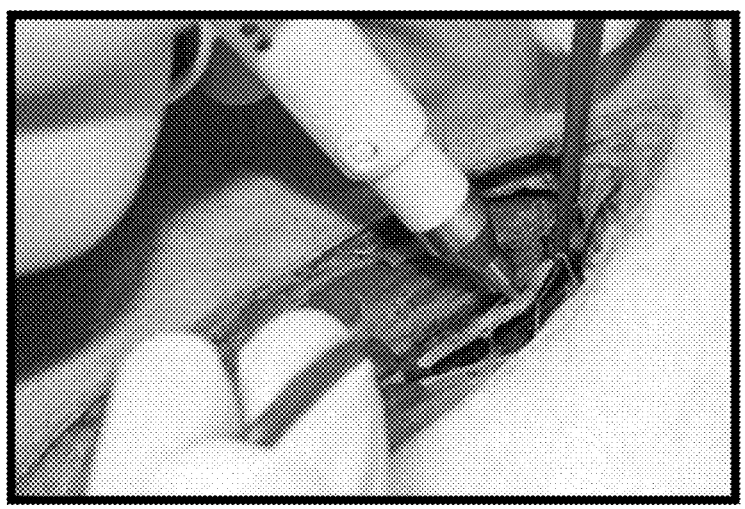
FIG. 6 is a photographic representation depicting a femoral artery that is exposed, isolated, and clamped for an arteriotomy procedure using a 6 mm vascular punch.

FIG. 6 is a photographic representation depicting a femoral artery that is exposed, isolated, and clamped for an arteriotomy procedure using a 6 mm vascular punch. After creating the 6 mm arteriotomy, the clamps were released and free bleeding was allowed for 45 seconds. Immediately after the free bleeding and while bleeding continued, eight (8) pieces measuring 5×5 cm of the disclosed hemostatic gauze were packed in the wound in about 1 minutes time. Upon packing, the hemostatic gauze was placed in the wound and low pressure was applied for 3 more minutes. After the three minutes the hemostatic gauze was left in place with no further physical contact or intervention. The bleeding status was monitored for 150 minutes (blood was suctioned continuously when needed, and weighed) and vital signs were continuously monitored and recorded.

Baseline Conditions

Physiology parameters, complete blood count (CBC), arterial blood gas values (ABG) and thromboelastograph (TEG) were taken before treatment from all the tested animals. Physiology parameters such as body weight, mean arterial pressure (MAP), pH, Hematocrit, and body temperature were recorded. The coagulation profiles, which included platelets, fibrinogen, PT, aPTT were also examined. The average and standard deviation (SD) values for the testing group are presented in Table 3 and compared to the standard normal range of CBC and associated coagulation profile values.

TABLE 3

Baseline values of complete blood count (CBC) of tested animals and normal values of CBC.

| Measure | Baseline (n = 5) | Normal Values |
|---|---|---|
| Body weight (Kg) | 35.8 ± 1.3 | 35-38 |
| Temperature (° C.) | 35.3 ± 1.1 | 35-37 |
| MAP (mmHg) | 62.2 ± 2.2 | 60-80 |
| HGB (g/dL) | 11.0 ± 0.9 | 9.8-15.7 |
| HCT (%) | 34.3 ± 2.4 | 30-49.1 |
| PLT (1,000/μL) | 275.6 ± 95.9 | 208-647 |
| PT (s) | 11.2 ± 0.3 | 9.9-11.8 |
| aPTT (s) | 10.4 ± 1.0 | 8.1-12.8 |
| Fibrinogen (mg/dL) | 137.6 ± 26.8 | 90-205 |
| pH | 7.4 ± 0.0 | 7.40-7.43 |
| Base Excess (nM) | 5.6 ± 0.2 | 2-7 |

HGB—hemoglobin;
HCT—hematocrit;
PLT—platelets;
PT—prothrombin time;
aPTT—activated partial prothromboplastin time.

Results

Table 4 presents the final coagulation and hematological profile of the animals treated with the disclosed improved hemostatic gauze. The Hematology Profile parameters (Hemoglobin (HGB), Hematocrit (HCT) and Platelet counts (PLT)), and the Coagulation Profile (Prothrombin time (PT), Activated Partial Prothromboplastin time (aPTT), and Fibrinogen) were analyzed. All parameters were within the normal range for all animals.

TABLE 4

Baseline and final Physiological and Hematological Measurements of all animals treated with the disclosed hemostatic gauze.

| | 81 | | 82 | | 83 | | 84 | | 85 | | Mean ± SD Values (n = 5) | |
|---|---|---|---|---|---|---|---|---|---|---|---|---|
| Swine | Baseline | Final | Baseline | Final | Baseline | Final | Baseline | Final | Baseline | Final | Baseline | Final |
| Body weight (kg) | 85 | | 38 | | 83 | | 36 | | 35 | | 35.8 ± 1.3 | |
| Temperature (° C.) | 38.5 | 35.5 | 34.9 | 34.8 | 36.6 | 34.7 | 34.3 | 33.2 | 34.4 | 32.9 | 35.3 ± 1.1 | 34.2 ± 1.1 |
| MAP (mmHg) | 61 | 58 | 64 | 60 | 63 | 52 | 65 | 56 | 60 | 59 | 62.2 ± 2.2 | 57.0 ± 8.2 |
| HGB (g/dL) | 10.4 | 8.9 | 9.8 | 7.8 | 11.1 | 8.3 | 12.2 | 11 | 11.4 | 58 | 11.0 ± 0.8 | 8.3 ± 3.9 |
| HCT (%) | 32.4 | 28.3 | 31.2 | 24.7 | 35 | 26.1 | 38.5 | 33.9 | 36.3 | 18.5 | 34.8 ± 2.4 | 26.3 ± 5.6 |
| PLT (1,000/μL) | 228 | 209 | 291 | 259 | 256 | 278 | 178 | 201 | 450 | 375 | 275.8 ± 95.9 | 224.0 ± 43.3 |
| PT (s) | 11.3 | 11.3 | 307 | 13.2 | 11.4 | 11.7 | 11.2 | 10.9 | 13.3 | 12.3 | 11.2 ± 0.9 | 11.5 ± 0.5 |
| aPTT (s) | 11.1 | 10.9 | 10.4 | 13.2 | 8.6 | 10 | 9.3 | 11.3 | 11.8 | 12.3 | 10.4 ± 1.0 | 11.1 ± 0.8 |
| fibrinogen (mg/dL) | 145 | 109 | 142 | 98 | 126 | 99 | 101 | 94 | 174 | 74 | 187.6 ± 26.8 | 94.8 ± 12.8 |
| pH | 7.39 | 7.37 | 7.42 | 7.41 | 7.39 | 7.41 | 7.4 | 7.41 | 7.4 | 7.38 | 7.4 ± 0.0 | 7.4 ± 0.0 |
| Base Excess (nM) | 3.6 | 4.7 | 5.5 | 5.7 | 5.3 | 6.9 | 5.9 | 6.2 | 5.5 | 2.4 | 5.8 ± 0.2 | 5.2 ± 3.7 |

HGB—hemoglobin;
HCT—hemarocrit;
PLT—platelets;
PT—prothrombin time;
aPTT—activated partial prothromboplastin time.

The total pre-treatment blood loss (free bleeding during 45 seconds) of all tested animals was calculated. The result was 3.2±0.9 mL/Kg (116.2±36.6 mL) in average.

Hemostasis Time

Upon arteriotomy and clamp release, free bleeding was allowed for 45 seconds. The average total hemostasis time was 144 minutes. The disclosed hemostatic gauze achieved hemostasis in all subjects after the placement with low pressure application. Additionally, three (3) of the subjects experienced initial hemostasis (where no bleeding was observed for at least 3 minutes upon pressure release) and maintained hemostasis for 150 min. Animals which did not achieve immediate hemostasis reached total hemostasis at times ranging from 30 to 140 min.

Post Treatment Blood Loss

The pre and post treatment blood loss results are presented in Table 5 below, both in mL and mL/Kg. For the animals treated with the disclosed hemostatic gauze, the average post-treatment blood loss was 7.1±9.8 mL/Kg (261.0±360.2 mL).

TABLE 5

Hemostatic outcome of tested animals treated with the disclosed hemostatic gauze.

| | Disclosed Hemostatic Gauze | |
| --- | --- | --- |
| Outcome | Survived (n = 5) | Non survived (n = 0) |
| Body weight (Kg) | 35.8 ± 1.3 | N/A |
| MAP Pre-injury (mmHg) | 61.2 ± 2.2 | N/A |
| MAP after free bleeding (mmHg) | 54.0 ± 3.4 | N/A |
| MAP 60 min post injury (mmHg) | 62.6 ± 4.9 | N/A |
| MAP final survivors (mmHg) | 58 ± 4.5 | N/A |
| Initial hemostasis | 3/5 | N/A |
| Total hemostasis time (min) | 144 ± 8.9 | N/A |
| Pre-treatment blood loss (mL) | 116 ± 36.6 | N/A |
| Pre-treatment blood loss (mL/kg) | 3.2 ± 0.9 | N/A |
| Post-treatment blood loss (mL) | 261.0 ± 360.2 | N/A |
| Post-treatment blood loss (mL/kg) | 7.1 ± 9.8 | N/A |
| Total resuscitation fluid (L) | 1.26 ± 1.35 | N/A |
| Survival time (min) | 150 | N/A |

Blood Coagulation Measurements with Thrombelastography (TEG)

The change in coagulation profile was also reflected in the blood clotting analysis employing the thrombelastography (TEG) method. Four values that represent clot formation are determined by the TEG method (Table 6) and include: the reaction time (R value) represents the time until the first evidence of a clot is detected; the K value is the time from the end of R value time until the clot reaches 20 mm in size and represents the speed of clot formation; the angle value is the tangent of the curve made as the maximum K value is reached and offers similar information to the K value. The maximum amplitude (MA) is a reflection of the strength of the clot.

TABLE 6

Blood coagulation measurements with thrombelastography (TEG) of all tested animals before and after exposure to the disclosed hemostatic gauze

| TEG Parameter | Baseline all animals | Hemostatic Gauze Final |
| --- | --- | --- |
| R-time (min) | 8.71 ± 3.58 | 10.78 ± 3.98 |
| K-time (min) | 3.13 ± 1.63 | 3.53 ± 1.03 |

TABLE 6-continued

Blood coagulation measurements with thrombelastography (TEG) of all tested animals before and after exposure to the disclosed hemostatic gauze

| TEG Parameter | Baseline all animals | Hemostatic Gauze Final |
| --- | --- | --- |
| Angle (°) | 58.46 ± 16.92 | 53.90 ± 0.71 |
| MA (mm) | 71.23 ± 7.51 | 63.58 ± 5.90 |

Data expressed as Mean ± SD

Gauze Removal

At the end of the monitoring time and after the removal of the hemostatic gauze, the status of the hemostatic integrity and the stability of the clot was examined. These parameters examine whether a physiological clot formed during the procedure, or instead mechanical blocking of the blood flow occurred.

FIG. 7 is a photographic representation depicting a sample of the disclosed non-oxidized hemostatic device of a size of approximately 8×100 cm after application and removal at a time of about 150 minutes in a swine femoral artery model, according to an embodiment. In FIG. 7, photograph 700 includes disclosed oxidized hemostatic device 702 after application and removal in a swine femoral artery. In FIG. 7, evidence of clotting formation is observed. Additionally, all animals treated with the disclosed hemostatic gauze exhibited a steady rate of bleeding before and after gauze removal.

Figure 8:
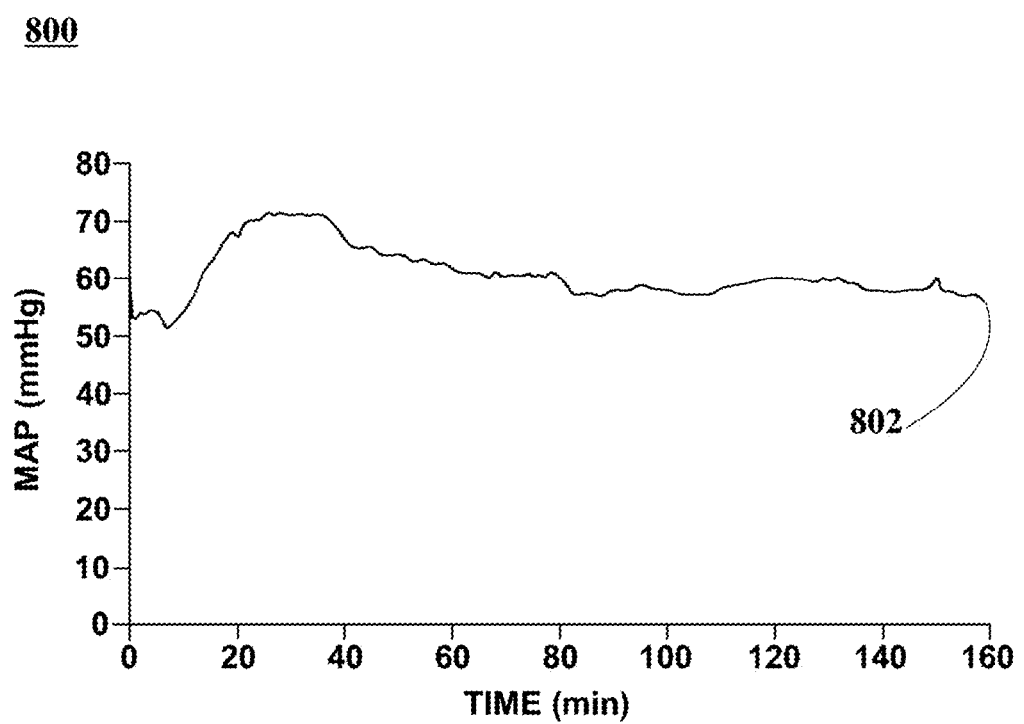
FIG. 8 is a graphical representation illustrating the mean arterial pressure (MAP) values over time of the subject animals tested during the monitoring period.

Results and Conclusions:

FIG. 8 is a graphical representation illustrating the MAP values over time of the subject animals tested during the monitoring period. In FIG. 8 tested animals MAP average 802 indicates the recovery to acceptable MAP levels after the initial pressure drops due to the free bleeding time period. Further, the tested animals MAP average 802 remains relatively constant throughout the In vivo study to evaluate bleeding control and effectiveness of the disclosed hemostatic gauze.

In conclusion, all 5 test to determine bleeding control and effectiveness of the disclosed hemostatic gauze in non-compressional scenarios were determined to be successful. Additionally, all animals lived through the inspection time of 150 minute and all end-point parameters were fulfilled. In all animals, The $ETCO_2$ did not change significantly and the MAP values remained relatively constant throughout the experiment. The disclosed hemostatic gauze achieved immediate hemostasis (for at least 3 minutes) upon pressure release in three (3) of the five (5) cases. As a result, the disclosed hemostatic gauze passed all acceptance criteria. According to these results, the hemostatic gauze exhibited a significant capability in non-compressional hemorrhage control of severe traumatic injuries.

Non-Oxidized Structure of the Hemostatic Device

In some embodiments, due to the non-oxidized nature of the cellulose, the cellulosic structure of the hemostatic device preserves its strength and stability as well as the degree of polymerization (DP) and the length of the fibers. In these embodiments, the hemostatic device exhibits increased integrity and improved stability when exposed to severe bleeding. Further to these embodiments, the hemostatic device remains stable throughout the time needed to control bleeding. In an example, the enhanced absorption and membrane stability of the non-oxidized hemostatic device is assessed by comparing the average water uptake of the disclosed hemostatic device with conventional ORC hemostats in an aqueous medium.

Test. 6 Conductivity Experiments

Method

Materials: 3 samples of the disclosed hemostatic device and 9 samples of conventional ORC hemostatic device (3 samples of 3 different conventional ORC hemostat products)

Statistical Analysis: Test results are calculated and presented as their mean value.

Equipment: Scissors, 100 mL beaker, Soft water, Magnet plate and stirrer, Conductivity & pH Meter (Lutron WA-2015), Conductivity measuring probes, Calibration standard solutions, Conductivity 1.413 mS, Stop watch.

Test Procedure: All samples were cut to a size of 5 cm×5 cm. Add 100 mL of soft water at ambient temperature to a beaker. Drop a magnet stirrer into the beaker containing soft water, and let it stir at high velocity. Calibrate the conductivity meter according to the manual of the device using a conductivity calibration standard solution of 1.431 mS. Place the conductivity probe into the water and measure the initial water conductivity. Place the sample of the disclosed hemostatic device into the water and measure and record the conductivities every minute up to a time of about 80 minutes. Repeat the procedure for the remaining hemostatic devices as well as for every sample of conventional ORC hemostat products.

Figure 9:
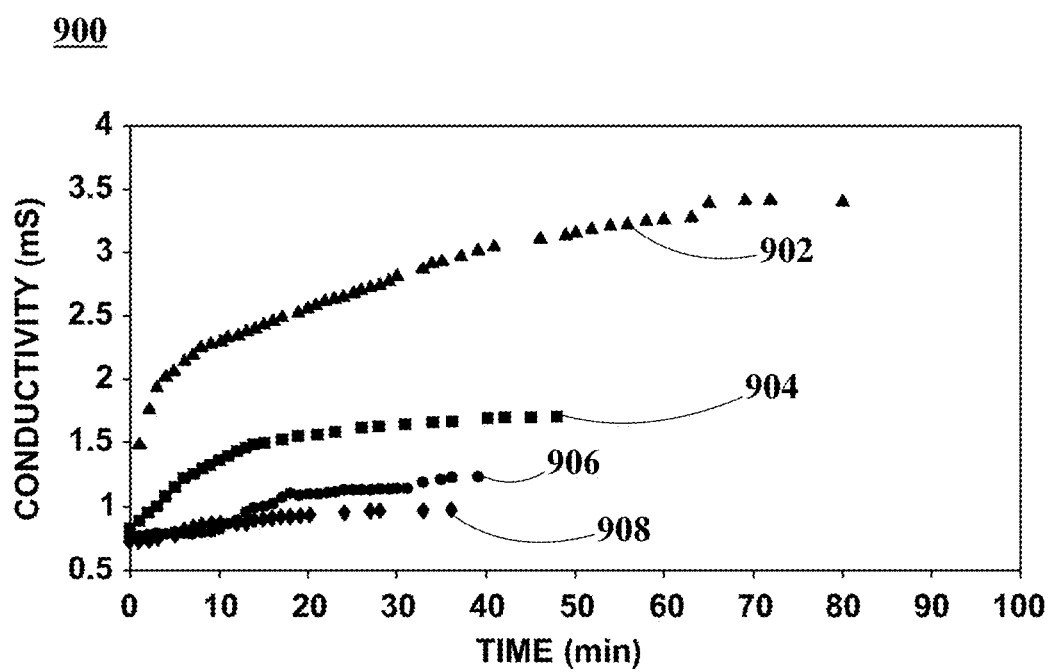
FIG. 9 is a graphical representation illustrating the conductivity values associated with the disclosed non-oxidized hemostatic device as well as with other conventional ORC hemostatic devices, according to an embodiment.

FIG. 9 is a graphical representation illustrating the conductivity measurements of the disclosed non-oxidized hemostatic device and other conventional ORC hemostatic devices. In FIG. 9, graph 900 includes conductivity curve 902, conductivity curve 904, conductivity curve 906, and conductivity curve 908.

In some embodiments, conductivity curve 902 illustrates conductivity measurements associated with the disclosed non-oxidized hemostatic device. In these embodiments, conductivity curves 904, 906, and 908 illustrate conductivity measurements associated with three different samples of conventional ORC hemostatic devices.

In FIG. 9, conductivity curve 902 of graph 900 exhibits higher conductivity when compared to conductivity curves 904, 906, and 908. In some embodiments, the improved stability and integrity of the disclosed hemostatic device, as represented by conductivity curve 902, is illustrated by the increased conductivity values that are observed for longer periods of time. In these embodiments, the increased conductivity of the disclosed hemostatic device results in enhanced clotting promotion. Further to these embodiments, the conductivity values achieved by the hemostatic device are up to about five times greater than conductivity values exhibited by conventional ORC hemostat products.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for producing a hemostatic device, comprising:
    forming a first reaction product by reacting non-oxidized cellulose fibers with at least one first alkalization agent in the presence of at least one suitable solvent, wherein the first reaction product comprises a non-oxidized alkali-cellulose;
    forming a second reaction product by reacting a monohalo-organic compound with a second alkalization agent in a solution, wherein the second reaction product comprises a saturated solution and a sediment formed by the reaction between the monohalo-organic compound with a second alkalization agent in the solution;
    heating the saturated solution to a temperature sufficient to dissolve at least a portion of the sediment; and
    reacting the non-oxidized alkali-cellulose with the second reaction product to form an improved carboxymethyl cellulose for use as a hemostatic device.

2. The method of claim 1, wherein the at least one suitable solvent is selected from the group consisting of water, ethanol, toluene, acetone, 2-propanol, or any mixture thereof.

3. The method of claim 1, wherein the at least one first alkalization agent, the second alkalization agent, or both are selected from the group consisting of sodium hydroxide (NaOH), potassium hydroxide (KOH), calcium hydroxide ($Ca(OH)_2$), and any mixture thereof.

4. The method of claim 1, further comprising forming a slurry by combining the at least one first alkalization agent, the non-oxidized cellulose fibers, and the at least one suitable solvent.

5. The method of claim 4, wherein the non-oxidized cellulose fibers are present in the slurry in an amount within the range from about 0.1 weight % to about 40 weight %.

6. The method of claim 4, wherein the non-oxidized cellulose fibers are present in the slurry in an amount within the range from about 2.0 weight % to about 10.0 weight %.

7. The method of claim 4, wherein the non-oxidized cellulose fibers are present in the slurry in an amount within the range from about 2.0 weight % to about 5.0 weight %.

8. The method of claim 4, wherein the at least one suitable solvent comprises at least two solvents.

9. The method of claim 1, wherein the forming of the first reaction product is carried-out at a temperature from about room temperature to about 45° C.

10. The method of claim 1, wherein the monohalo-organic compound comprises a monohaloacetic acid or a salt form of a monohaloacetic acid.

11. The method of claim 10, wherein the monohaloacetic acid comprises monochloroacetic acid ($ClCH_2COOH$).

12. The method of claim 10, wherein the salt form of the monohaloacetic acid comprises monochloroacetate.

13. The method of claim 1, wherein forming the second reaction product is carried-out at a temperature from about 40° C. to about 60° C.

14. The method of claim 1, wherein the improved carboxymethyl cellulose forms a hemodynamic gel when it contacts blood and can absorb up to about 2500 percent of its own weight in an aqueous media.

15. The method of claim 1, wherein the sediment comprises sodium monochloroacetate.

16. The method of claim 1, wherein the improved carboxymethyl cellulose is bioabsorbable, biodegradable, or biocompatible.

17. The method of claim 1, further comprising maintaining a concentration of a dissolved portion of the sediment in the saturated solution during the reacting of the non-oxidized alkali-cellulose with the second reaction product.

18. The method of claim 1, wherein the at least one first alkalization agent and the second alkalization agent comprise the same alkalization agent.

19. The method of claim 1, wherein the sediment comprises a monochloroacetate salt.

20. The method of claim 1, wherein the monohalo-organic compound comprises a salt form of a monohaloacetic acid.

21. The method of claim 1, wherein the concentration of water in the saturated solution is about 3.6%.

22. A method for producing a hemostatic device, comprising:

forming a reaction product by reacting non-oxidized cellulose fibers with at least one alkalization agent in the presence of at least one suitable solvent, wherein the reaction product comprises a non-oxidized alkali-cellulose;

forming a saturated solution by adding a salt form of a monohalo-organic compound to the reaction product, the saturated solution comprising a sediment wherein the concentration of water in the saturated solution is about 3.6%;

heating the saturated solution to a temperature sufficient to dissolve at least a portion of the sediment; and reacting the non-oxidized alkali-cellulose with a dissolved portion of the sediment to form an improved carboxymethyl cellulose suitable for use as a hemostatic device.

23. The method of claim 22, wherein the at least one suitable solvent is selected from the group consisting of water, ethanol, toluene, acetone, 2-propanol, or any mixture thereof.

24. The method of claim 22, wherein the at least one alkalization agent is selected from the group consisting of sodium hydroxide (NaOH), potassium hydroxide (KOH), calcium hydroxide ($Ca(OH)_2$), and any mixture thereof.

25. The method of claim 22, further comprising forming a slurry by combining the at least one alkalization agent, the non-oxidized regenerated cellulose, and the at least one suitable solvent.

26. The method of claim 22, wherein the forming the reaction product is carried-out at a temperature from about room temperature to about 45° C.

27. The method of claim 22, wherein the salt form of the monohalo-organic compound comprises monochloroacetate.

28. The method of claim 22, wherein the temperature is selected from a range of from about 40° C. to about 60° C.

29. The method of claim 22, wherein the hemostatic device forms a hemodynamic gel when it contacts blood and can absorb up to about 2500 percent of its own weight when fully immersed in an aqueous media.

30. The method of claim 22, wherein the sediment comprises sodium monochloroacetate.

31. The method of claim 22, wherein the hemostatic device is bioabsorbable, biodegradable or biocompatible.

32. The method of claim 22, further comprising maintaining a concentration of a dissolved portion of the sediment in the saturated solution during the reacting of the non-oxidized alkali-cellulose with the dissolved portion of the sediment.

33. The method of claim 22, wherein the sediment comprises a monochloroacetate salt.

* * * * *